United States Patent
Sawada et al.

(10) Patent No.: US 8,162,286 B2
(45) Date of Patent: Apr. 24, 2012

(54) PIEZOELECTRIC DRIVEN CONTROL VALVE

(75) Inventors: Yohei Sawada, Osaka (JP); Kaoru Hirata, Osaka (JP); Ryosuke Dohi, Osaka (JP); Kouji Nishino, Osaka (JP); Nobukazu Ikeda, Osaka (JP)

(73) Assignee: Fujikin Incorporated, Osaka (JP)

( * ) Notice: Subject to any disclaimer, the term of this patent is extended or adjusted under 35 U.S.C. 154(b) by 395 days.

(21) Appl. No.: 12/593,580

(22) PCT Filed: Mar. 13, 2008

(86) PCT No.: PCT/JP2008/000572

§ 371 (c)(1),
(2), (4) Date: Sep. 28, 2009

(87) PCT Pub. No.: WO2008/129783

PCT Pub. Date: Oct. 30, 2008

(65) Prior Publication Data

US 2010/0127196 A1    May 27, 2010

(30) Foreign Application Priority Data

Mar. 30, 2007 (JP) .................................. 2007-090082

(51) Int. Cl.
*F16K 31/02* (2006.01)

(52) U.S. Cl. ............. 251/129.06; 251/61.4; 251/129.02

(58) Field of Classification Search ............... 251/61.1, 251/61.2, 61.4, 129.02, 126.06
See application file for complete search history.

(56) References Cited

U.S. PATENT DOCUMENTS

| 5,470,045 | A | * | 11/1995 | Kazama et al. | .......... 251/129.15 |
| 6,062,533 | A | * | 5/2000 | Kappel et al. | .................... 251/57 |
| 6,345,803 | B2 | * | 2/2002 | Sakurai | .................... 251/129.06 |
| 6,520,479 | B1 | * | 2/2003 | Sato | .................... 251/129.06 |
| 6,776,390 | B1 | | 8/2004 | Boecking | |
| 2002/0163282 | A1 | | 11/2002 | Heinz | |

FOREIGN PATENT DOCUMENTS

EP    1 082 567 A1    3/2001
JP    02-138582 A    5/1990

(Continued)

OTHER PUBLICATIONS

International Search Report, issued in corresponding application No. PCT/JP2008/000572, completed Apr. 4, 2008, mailed Apr. 15, 2008.

*Primary Examiner* — John Fristoe, Jr.
(74) *Attorney, Agent, or Firm* — Griffin & Szipl, P.C.

(57) ABSTRACT

Stable flow control is made possible even under high-temperature environments by relieving tensional force applied to a piezoelectric element when a piezoelectric actuator is retracted. Thus, a piezoelectric driven control valve includes: a body having a valve seat; a metal diaphragm to contact with and separate from the valve seat; an actuator box supported ascendably and descendably on the body; a split base fixed to the body; a disc spring pressing and urging the actuator box downward to bring the metal diaphragm into contact with the valve seat; and a piezoelectric actuator housed inside the actuator box and that extends upward with application of voltage to press the actuator box upward against the elastic force of the disc spring, and a precompression mechanism, for applying a compression force constantly to piezoelectric elements in the piezoelectric actuator, provided between the split base and the piezoelectric actuator.

4 Claims, 10 Drawing Sheets

FOREIGN PATENT DOCUMENTS

| | | |
|---|---|---|
| JP | 04-008974 A | 1/1992 |
| JP | 2002541401 T | 12/2002 |
| JP | 2003-507679 T | 2/2003 |
| JP | 2003-120832 A | 4/2003 |
| JP | 2004-197554 A | 7/2004 |
| JP | 2005-149075 A | 6/2005 |
| JP | 2007-192269 A | 8/2007 |
| WO | 00/60259 | 10/2000 |
| WO | 01/014731 A1 | 3/2001 |
| WO | 2007083439 A1 | 7/2007 |

* cited by examiner

PRIOR ART

PRIOR ART

PIEZOELECTRIC DRIVEN CONTROL VALVE

This is a National Phase Application in the United States of International Patent Application No. PCT/JP2008/000572 filed Mar. 13, 2008, which claims priority on Japanese Patent Application No. 2007-090082, filed Mar. 30, 2007. The entire disclosures of the above patent applications are hereby incorporated by reference.

TECHNICAL FIELD OF THE INVENTION

The present invention relates to improved piezoelectric driven control valves that are used as control valves in pressure type flow control devices, or in flow control units of a mass flow controller, such as are provided mainly in a gas control line of semiconductor manufacturing equipment, or the like. In particular, the present invention relates to a piezoelectric driven control valve that relieves a tensional force applied to a piezoelectric element when a piezoelectric actuator is retracted so as to prevent the piezoelectric element from being damaged and the piezoelectric driven control valve makes possible high-precision and stable flow control even under high-temperature environments using high-temperature reaction gases.

BACKGROUND OF THE INVENTION

In recent years, pressure type flow control devices have been widely adopted in place of mass flow controllers, for example, in semiconductor manufacturing equipment and chemical manufacturing equipment. Pressure type flow control devices generally adopt a so-called "metal diaphragm type" control valve due to its advantages of higher corrosion resistance, lower dust generation, better gas replacement, and higher opening and closing speed. Also, pressure type flow control devices generally adopt a piezoelectric driven type drive unit (i.e., a piezoelectric actuator) due to its advantages of larger thrust, better responsiveness and controllability.

The structure of metal diaphragm type control valves, in which a piezoelectric actuator (piezo-positioner) is used for the drive unit, are conventionally known as disclosed in Japanese Published Unexamined Patent Application No. 2003-120832 (Patent Document 1), etc., for example.

That is, as shown in FIG. 11, such a metal diaphragm type control valve 30 is formed as a normal close-type piezoelectric driven control valve including: a body 31 with a valve chamber 31a and a valve seat 31b formed therein; a metal diaphragm 32 disposed inside the valve chamber 31a to be in contact with, and separated from, the valve seat 31b; a holding adapter 33 for pressing the outer peripheral edge of the metal diaphragm 32 in an air tight manner toward the body 31; a half-split base 34 for pressing the holding adapter 33 toward the body 31; a base presser 35 for fixing the holding adapter 33 and the split base 34 to the body 31; an actuator box 36 supported ascendably and descendably by the base presser 35; a diaphragm presser 37 inserted and installed at the lower end of the actuator box 36 so as to be in contact with the metal diaphragm 32; a disc spring 38 provided between the split base 34 and the actuator box 36 so as to press and urge the actuator box 36 downward; a piezoelectric actuator (i.e., a piezo-positioner) 40 housed inside the actuator box 36 with the lower end thereof supported on the split base 34 via a ball receiver 39; and an adjustment cap nut 43 threadably mounted on the upper end portion of the actuator box 36 so as to positionably support the upper end of the piezoelectric actuator 40 via a bearing receiver 41 and a bearing 42, wherein extension of the piezoelectric actuator 40 due to application of a voltage causes the actuator box 36 to ascend while supported by the base presser 35 against the elastic force of the disc spring 38 so as to, accordingly, cause the metal diaphragm 32 to be separated by the elastic force thereof from the valve seat 31b and the valve is opened. On the other hand, the removal of voltage applied to the piezoelectric actuator 40 causes the piezoelectric actuator 40 to return to its original length dimension from an extended state and, at the same time, the actuator box 36 is pressed down by the elastic force of the disc spring 38 to accordingly cause the metal diaphragm 32 to be pressed downward by the diaphragm presser 37 so as to come into contact with the valve seat 31b and, thereby, the valve is closed.

The piezoelectric driven control valve 30, in which the axial center of all the members can be aligned automatically, has the advantage that the assembling accuracy increases significantly so that variation in assembling accuracy, and the hysteresis phenomenon observed regarding valve stroke during opening and closing operations becomes less likely to occur.

The piezoelectric actuator (piezo-positioner) 40 used in the piezoelectric driven control valve 30 is a stacked-type piezo-positioner in which stacked-type piezoelectric elements 40b are housed in a sealed manner inside a metal casing 40a as shown in FIG. 12. This stacked-type piezoelectric actuator 40 is arranged in a manner so that with extension and retraction of the piezoelectric elements 40b, a hemispherical displacement member 40c, provided at the leading end of the casing 40a, reciprocates along the axial center of the piezoelectric actuator 40.

However, the stacked-type piezoelectric actuator 40 suffers from a problem caused by the fact that the extension and retraction rate of the piezoelectric elements 40b is greater than that of the displacement member 40c when the piezoelectric actuator 40 is extended and retracted, which causes a tensional force to be applied between piezoelectric elements 40b adjacent each other when the piezoelectric actuator 40 is retracted, which causes damage to the piezoelectric elements 40b and shortens the product lifetime. To address this problem, it is necessary, when actually operating the stacked-type piezoelectric actuator 40, to apply a precompression load to the piezoelectric elements 40b in the retraction direction because the piezoelectric elements 40b have a low tolerance for tensional force. The application of the precompression load in the retraction direction relieves the tensional force applied between piezoelectric elements 40b adjacent each other to prevent damage to the piezoelectric elements 40b from the tensional force.

In accordance with the conventional piezoelectric driven control valve 30 shown in FIG. 11, because the actuator box 36 is pressed and urged downward by the elastic force of the disc spring 38, the piezoelectric actuator 40 is in a state precompressed by the elastic force of the disc spring 38. However, the disc spring 38 used in the piezoelectric driven control valve 30 is provided to press and urge the actuator box 36 downward so as to cause the diaphragm presser 37 to bring the metal diaphragm 32 into contact with the valve seat 31b. Therefore, if the disc spring 38 has a very strong elastic force, then the metal diaphragm 32 and/or the valve seat 31b may be damaged. For this reason, the disc spring 38 in the piezoelectric driven control valve 30 cannot have a very strong elastic force. Accordingly, the piezoelectric actuator 40 also cannot be applied with a very large precompression load because, otherwise, it may suffer from the problem wherein the piezoelectric elements 40b are damaged by application of a large tensile stress.

The conventional piezoelectric driven control valve 30 suffers from another problem in that when it is used under a high-temperature environment, such as at a temperature of 100 degrees C. or more, a gap forms between the upper end portion of the piezoelectric actuator 40 and the adjustment cap nut 43 threadably mounted on the upper end portion of the actuator box 36 due to thermal expansion of the actuator box 36 that houses the piezoelectric actuator 40. This gap causes a generation force, when the piezoelectric actuator 40 is extended, to not be transmitted reliably and successfully to the actuator box 36, which makes high-precision flow control difficult. In particular, because the amount of displacement of the piezoelectric actuator 40 is extremely small, even a slight amount of thermal expansion of each member (e.g., actuator box 36) in the control valve 30 will have a great impact on the flow control characteristics of the conventional piezoelectric driven control valve 30. To solve this problem (namely, the gap formation due to thermal expansion of the actuator box 36), it may be useful to make a control valve 30 that has a structure in which the piezoelectric actuator 40 is applied preliminarily with an external compression force of approximately 200N. However, such a control valve has not yet been developed.

Patent Document 1: Japanese Published Unexamined Patent Application No. 2003-120832

PROBLEMS TO BE SOLVED BY THE INVENTION

The present invention has been made in consideration of the above-described problems, and an object thereof is to provide a piezoelectric driven control valve in which tensional force applied to the piezoelectric element, when the piezoelectric actuator is retracted, is relieved in order to prevent damage to the piezoelectric element as well as to make possible high-precision and stable flow control even under high-temperature environments.

SUMMARY OF THE INVENTION

In order to achieve the foregoing objects, the invention according to a first embodiment of the present invention is directed to a piezoelectric driven control valve that includes: a body provided with a valve seat formed at a bottom of an upward-opened valve chamber; a metal diaphragm disposed inside the valve chamber so as to be in contact with the valve seat through application of a downward pressure and so as to be separated from the valve seat due to an elastic force of the metal diaphragm when the downward pressure force is absent; a bottomed tubular actuator box supported to move ascendably and descendably on the body and the actuator box has a diaphragm presser disposed at a lower end of the actuator box so that the diaphragm presser is in contact with an upper surface of the metal diaphragm; a split base fixed to the body and having an upper wall inserted into an elongated guide hole that is formed in a peripheral wall of the actuator box at a lower end portion of the actuator box so as to face an upper surface of a bottom wall of the actuator box; a disc spring provided between the bottom wall of the actuator box and the upper wall of the split base so as to press and urge the actuator box downward so as to bring the metal diaphragm into contact with the valve seat using the diaphragm presser; and a piezoelectric actuator housed inside the actuator box, wherein an upper end portion of the piezoelectric actuator is supported positionably at the upper end of the actuator box and wherein a lower end of the piezoelectric actuator is supported on the upper wall of the split base, wherein the piezoelectric actuator is extended upward with application of a voltage to piezoelectric elements of the piezoelectric actuator so as to press the actuator box upward against an elastic force of the disc spring so that the metal diaphragm is separated from the valve seat due to the elastic force of the metal diaphragm, and a precompression mechanism, for applying a compression force constantly to the piezoelectric elements in the piezoelectric actuator, is provided between the upper wall of the split base and the lower end of the piezoelectric actuator.

The invention according to a second embodiment of the present invention is directed to a piezoelectric driven control valve that includes: a body provided with a valve seat formed at a bottom of an upward-opened valve chamber; a metal diaphragm disposed inside the valve chamber so as to be in contact with the valve seat through application of a downward pressure and so as to be separated from the valve seat due to by an elastic force of the metal diaphragm when the downward pressure force is absent; a tubular actuator box disposed above the valve chamber with a lower end portion of the actuator box fixed to the body; a stem disposed to move ascendably and descendably inside the lower end portion of the actuator box, wherein the stem is provided with a diaphragm presser disposed at a lower end of the stem so that the diaphragm presser is in contact with an upper surface of the metal diaphragm; a piezoelectric actuator housed inside the actuator box, wherein an upper end of the piezoelectric actuator is supported positionably at an upper end portion of the actuator box and wherein a lower end of the piezoelectric actuator is supported on the stem; and a cushioning disc spring is provided between an upper end of the stem and the lower end of the piezoelectric actuator and, when the metal diaphragm comes into contact with the valve seat, the metal diaphragm absorbs extension of the piezoelectric actuator so as to apply a predetermined pressure force to a seat member comprising the valve seat and a portion of the metal diaphragm that is in contact with the valve seat, and the piezoelectric actuator is extended downward with application of a voltage to piezoelectric elements disposed within the piezoelectric actuator so as to press the stem and the diaphragm presser down via the cushioning disc spring so that the metal diaphragm is brought into contact with the valve seat; and a precompression mechanism applies a compression force constantly (i.e., at all times) to the piezoelectric elements in the piezoelectric actuator, wherein the precompression mechanism is provided between the lower end of the piezoelectric actuator and the cushioning disc spring.

The invention according to a third embodiment of the present invention modifies the first embodiment so that the precompression mechanism is composed of: a shaft-shaped precompression part provided with a flange disposed so as to move vertically directly under the piezoelectric actuator and within the actuator box, wherein an upper end face of the precompression part is in contact with a displacement member provided on a lower end face of the piezoelectric actuator, and wherein a lower end face of the precompression part is contactable with the upper wall of the split base; and a precompression disc spring is provided between the flange of the precompression part and a stepped portion formed on an inner peripheral surface at a lower end portion of the actuator box and, when the lower end face of the precompression part comes into contact with the upper wall of the split base, the precompression disc spring presses the precompression part elastically upward so as to apply pressure constantly to the piezoelectric elements in the piezoelectric actuator.

The invention according to a fourth embodiment of the present invention modifies the second embodiment so that the precompression mechanism is composed of: a shaft-shaped precompression part provided with a flange disposed so as to move vertically directly under the piezoelectric actuator and within the actuator box, wherein an upper end face of the precompression part is in contact with a displacement member provided on a lower end face of the piezoelectric actuator, and wherein a lower end face of the precompression part is contactable with the cushioning disc spring; and a precompression disc spring is provided between the flange of the precompression part and a stepped portion formed on an inner peripheral surface at a lower end portion of the actuator box and, when the lower end face of the precompression part comes into contact with the cushioning disc spring, the precompression disc spring presses the precompression part elastically upward so as to apply pressure constantly to the piezoelectric elements in the piezoelectric actuator.

EFFECTS OF THE INVENTION

The piezoelectric driven control valve, according to the present invention, includes a precompression mechanism for applying a compression force constantly (i.e., at all times) to the piezoelectric elements in the piezoelectric actuator so that even if tensional force is applied between piezoelectric elements that are adjacent each other when the piezoelectric actuator is retracted, the tensional force applied between these piezoelectric elements adjacent to each other will be relieved by the compression force applied by the precompression mechanism. It is therefore possible, using the piezoelectric driven control valve according to the present invention, to prevent damage to the piezoelectric elements in the piezoelectric actuator from the tensional force. This feature of the invention can extend the lifetime of, and ensure the reliability of, the piezoelectric actuator. Also, the piezoelectric driven control valve, according to the present invention, includes a precompression mechanism for applying a compression force constantly to the piezoelectric elements in the piezoelectric actuator so that even if the actuator box housing the piezoelectric actuator is lengthened due to thermal expansion when the control valve is used under, for example, a high-temperature environment, then the piezoelectric actuator can apply a certain compression force constantly to the piezoelectric elements in the piezoelectric actuator using the precompression mechanism. Therefore, in accordance with the piezoelectric driven control valve of the present invention, a generation force can be transmitted reliably and successfully to the actuator box or the stem, which allows for high-precision flow control, when the piezoelectric elements in the piezoelectric actuator are extended. Furthermore, in the piezoelectric driven control valve according to the present invention, the precompression mechanism is composed of: a shaft-shaped precompression part provided with a flange disposed vertically, movably, and directly under the piezoelectric actuator and within the actuator box, wherein the upper end face of the precompression part is in contact with a displacement member provided on the lower end face of the piezoelectric actuator, and wherein the lower end face of the precompression part is contactable with the upper wall of the split base or the cushioning disc spring; and a precompression disc spring is provided between the flange of the precompression part and a stepped portion formed on the inner peripheral surface at the lower end portion of the actuator box so that when the lower end face of the precompression part comes into contact with the upper wall of the split base or the cushioning disc spring, the upper wall of the split base or the cushioning disc spring presses the precompression part elastically upward so as to apply pressure constantly to the piezoelectric elements in the piezoelectric actuator, whereby compression force applied to the piezoelectric elements in the piezoelectric actuator can be adjusted freely by changing the number of precompression disc springs. In addition, the precompression mechanism can be assembled relatively easily and without difficulty because only a precompression part and a precompression disc spring are provided between the upper wall of the split base, or the cushioning disc spring, and the lower end face of the piezoelectric actuator when assembling the precompression mechanism.

DESCRIPTION OF SYMBOLS

1: Piezoelectric driven control valve; 8: Body; 8a': Valve chamber; 8d: Valve seat; 9: Metal diaphragm; 11: Split base; 11b: Upper wall of split base; 13: Actuator box; 13a: Bottom wall of actuator box; 13c: Guide hole of actuator box; 13d: Stepped portion of actuator box; 14: Diaphragm presser; 15: Disc spring; 16: Piezoelectric actuator; 16a: Displacement member of piezoelectric actuator; 20: Precompression mechanism; 21: Precompression part; 21a: Flange of precompression part; 22: Precompression disc spring; 26: Stem; 27: Cushioning disc spring.

BEST MODE FOR CARRYING OUT THE INVENTION

Figure 1:
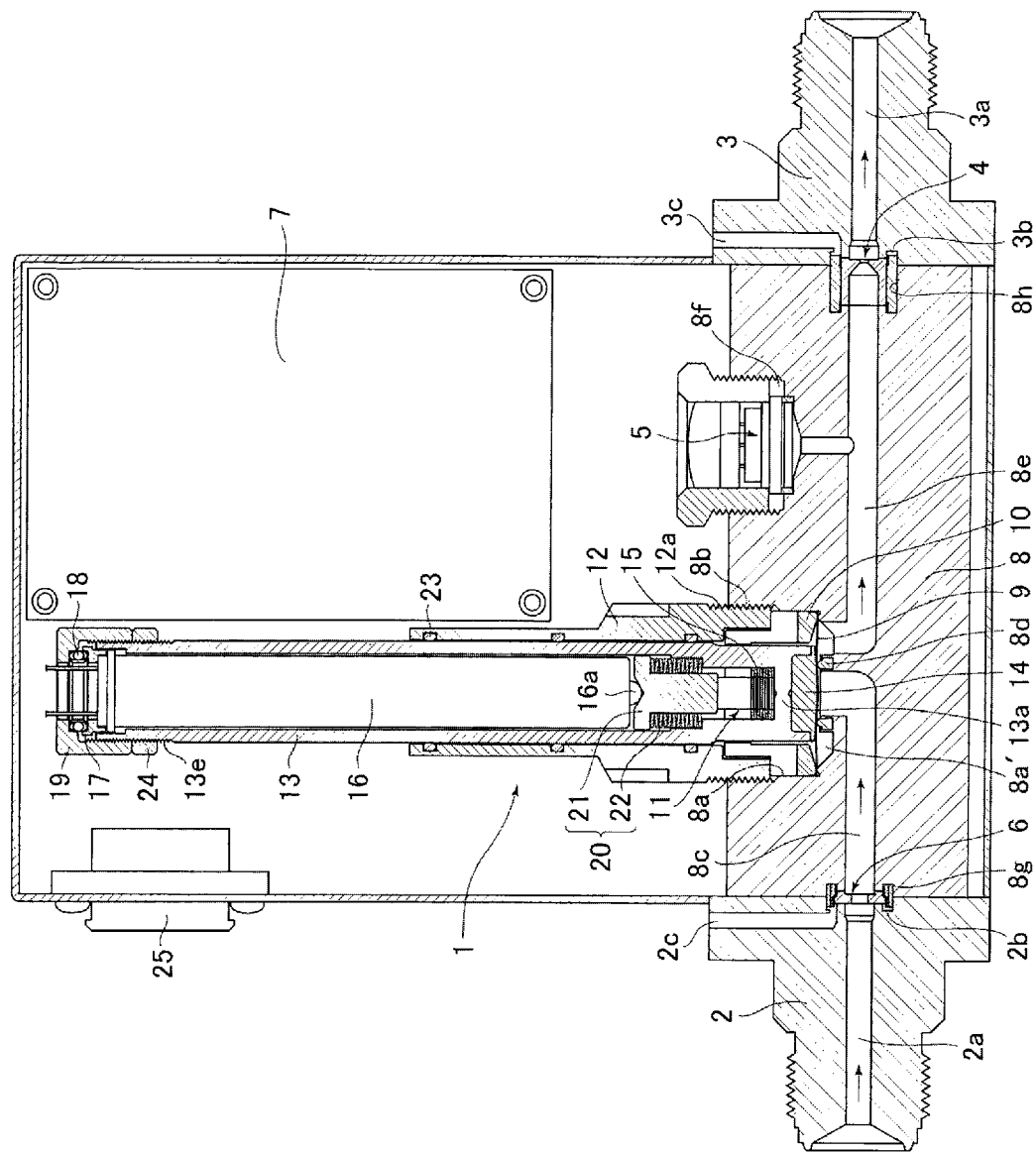
FIG. 1 is a longitudinal sectional front view of a pressure type flow control device employing a piezoelectric driven control valve according to a first illustrative embodiment of the present invention.

Embodiments of the present invention will hereinafter be described in detail with reference to the drawings. FIG. 1 shows a piezoelectric driven control valve 1 according to an illustrative first embodiment of the present invention, employed in a pressure type flow control device. The pressure type flow control device includes: the piezoelectric driven control valve 1; an inlet port block 2 connected on the upstream side of the piezoelectric driven control valve 1; an outlet port block 3 connected on the downstream side of the piezoelectric driven control valve 1; an orifice 4 for flow control provided on the downstream side of the piezoelectric driven control valve 1; a pressure sensor 5 provided on the upstream side of the orifice 4 to detect the upstream side pressure of the orifice 4; a gasket filter 6 provided on the upstream side of the piezoelectric driven control valve 1; and a control circuit 7 for controlling the piezoelectric driven control valve 1, in which the flow rate of passage of fluid through the orifice is calculated based on the upstream side pressure of the orifice 4 and, at the same time, controlled by opening and closing the piezoelectric driven control valve 1.

Figure 2:
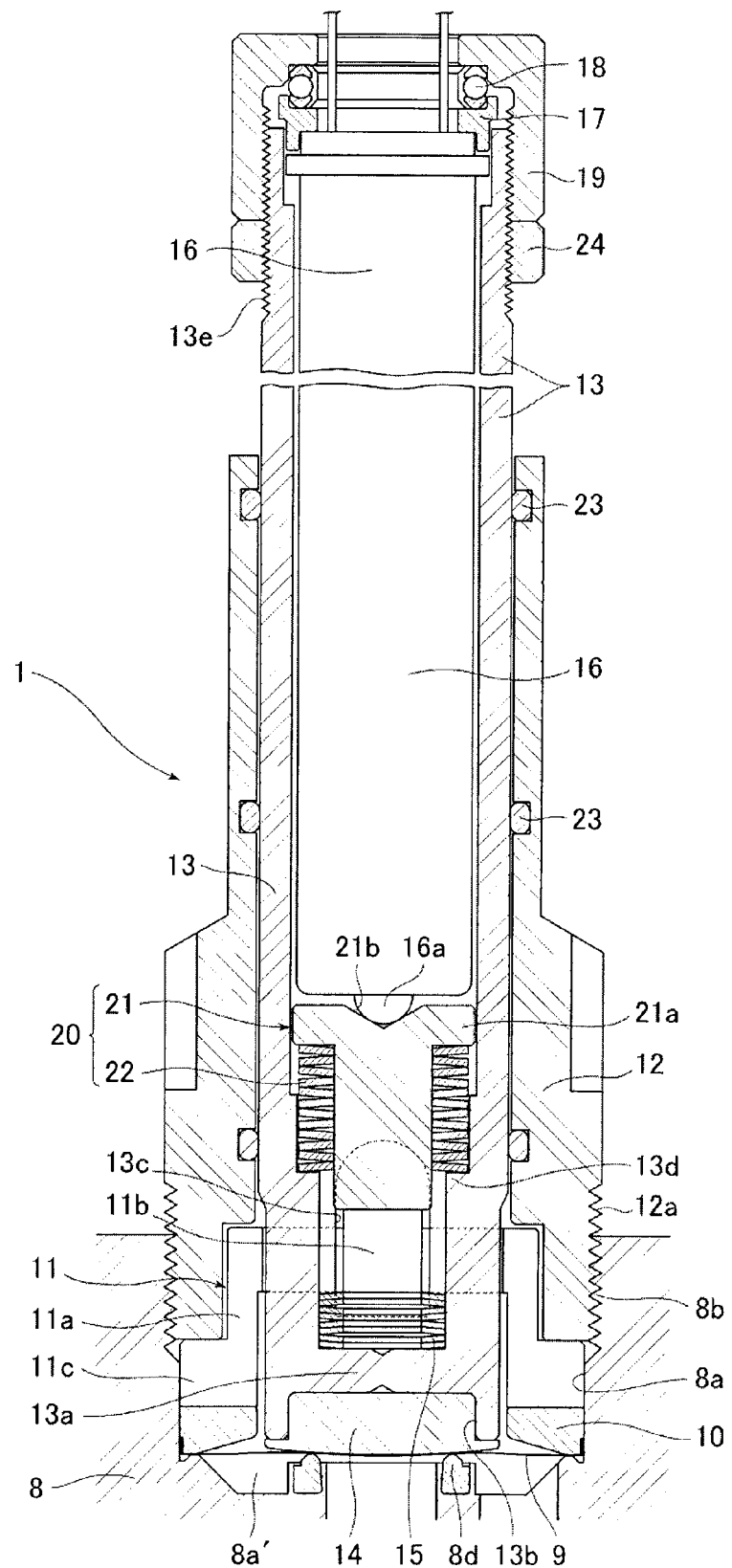
FIG. 2 is a longitudinal sectional front view of a substantial portion of the piezoelectric driven control valve according to the first illustrative embodiment of the present invention.

As shown in FIG. 2, the piezoelectric driven control valve 1 includes: a body 8 provided with a valve chamber 8a' and a valve seat 8d formed therein; a metal diaphragm 9 disposed inside the valve chamber 8a' so as to come in contact with, and separate from, the valve seat 8d; a holding adapter 10 for pressing the outer peripheral edge of the metal diaphragm 9 air-tightly toward the body 8; a split base 11 for pressing the holding adapter 10 toward the body 8; a base presser 12 for fixing the holding adapter 10 and the split base 11 to the body 8; a bottomed tubular actuator box 13 supported ascendably and descendably by the base presser 12 so the actuator box 13 ascendably and descendably moves within the base presser 12; a diaphragm presser 14 inserted and installed at the lower end of the actuator box 13 so as to contact the metal diaphragm 9; a disc spring 15 provided between the split base 11 and the actuator box 13 so as to press and urge the actuator box 13 downward; a piezoelectric actuator (piezo-positioner) 16 housed inside the actuator box 13 with the lower end of the piezoelectric actuator 16 supported on the split base 11 via a precompression part 21 of a precompression mechanism 20; an adjustment cap nut 19 threadably mounted on the upper end portion of the actuator box 13 to positionably support the upper end of the piezoelectric actuator 16 via a bearing receiver 17 and a bearing 18; and the precompression mechanism 20 is provided between the upper wall 11b of the split base 11 and the lower end of the piezoelectric actuator 16 so as to apply a compression force constantly (i.e., at least at all times) to piezoelectric elements in the piezoelectric actuator 16, in a manner that prevents damage of the piezoelectric elements in the piezoelectric actuator 16 due to tensional force, as well as in a manner that makes high-precision and stable flow control possible even under high-temperature environments employing high-temperature reaction gases. In the present embodiment of the invention, the piezoelectric driven control valve 1 is formed as a normal close-type control valve.

Specifically, as shown in FIGS. 1 and 2, the body 8 is made of stainless steel and is formed in a block shape, which includes a recessed portion 8a forming an upward-opened valve chamber 8a', a female screw 8b formed on the inner peripheral surface of the recessed portion 8a, an inlet passage 8c communicating with the valve chamber 8a', an annular valve seat 8d formed on the bottom surface that defines the valve chamber 8a', an outlet passage 8e communicating with the valve chamber 8a', a sensor installation hole 8f in which a pressure sensor 5 is inserted and installed, a filter installation hole 8g in which the gasket filter 6 is inserted and installed, and an orifice installation hole 8h in which an orifice 4 is inserted and installed. On the upstream side, the body 8 is connected, using multiple bolts (not shown in the drawings), with the stainless steel inlet port block 2 that includes an introduction passage 2a communicating with the inlet passage 8c of the body 8, a filter installation hole 2b formed on the outlet side of the introduction passage 2a, and a leak port 2c for checking for leakage of fluid. On the downstream side, the body 8 is also connected, using multiple bolts (not shown in the drawings), with the stainless steel outlet port block 3 that includes a discharge passage 3a communicating with the outlet passage 8e of the body 8, an orifice installation hole 3b formed on the inlet side of the discharge passage 3a, and a leak port 3c for checking for leakage of fluid.

As shown in FIGS. 1 and 2, the metal diaphragm 9 is formed by an ultra-thin plate made of a highly durable, corrosion-resistant, and heat-resistant highly-elastic alloy (e.g., SPRON 100), a nickel-cobalt-based alloy added with tungsten, molybdenum, titan, and chrome, etc., and is shaped in an inverted dish shape with the center thereof being swelled upward. The metal diaphragm 9 is disposed inside the recessed portion 8a so as to face the valve seat 8d and the outer peripheral edge thereof is held and fixed in an air-tight manner on the body 8 using the holding adapter 10. The metal diaphragm 9 is brought into contact with the valve seat 8d through downward pressure, and is to be separated from the valve seat 8d by the elastic force of the metal diaphragm when the downward pressure force is lost (i.e., absent). It is noted that the metal diaphragm 9 may be made of stainless steel, inconel, or other alloy steel, and may be formed by multiple metal diaphragms.

As shown in FIGS. 1 and 2, the holding adapter 10 is formed in an annular shape, is made of stainless steel and is inserted into the recessed portion 8a of the body 8 so as to press and fix the outer peripheral edge of the metal diaphragm 9 in an air-tight manner toward the body 8.

As shown in FIGS. 1, 2, 4, and 5, the split base 11 is composed of a pair of half-split base pieces 11', and is held and fixed on the body 8 by assembling the respective split base pieces 11' on either side at the lower end portion of the actuator box 13 in such a manner so as to face each other and, in this assembled state, the respective split base pieces 11' and the lower end portion of the actuator box 13 are inserted into the recessed portion 8a of the body 8 and then the lower end portion of the base presser 12 is squeezed (threaded) into the recessed portion 8a. The respective split base pieces 11' of the split base 11 are formed by half-splitting a body that includes a short cylindrical portion 11a, the upper end of which is formed as an upper wall 11b to be inserted into a guide hole 13c that is formed in the peripheral wall at the lower end portion of the actuator box 13 so as to face the upper surface of the bottom wall 13a of the actuator box 13, while the lower end of which is formed as a flange portion 11c to be inserted into the recessed portion 8a of the body 8. Multiple disc springs 15 for pressing and urging the actuator box 13 downward so as to bring the center of the metal diaphragm 9 into contact with the valve seat 8d using the diaphragm presser 14 are then provided between the upper wall 11b of the split base 11 and the bottom wall 13a of the actuator box 13.

As shown in FIGS. 1 and 2, the base presser 12 is made of stainless steel and is formed in a cylindrical shape, and on the outer peripheral surface at the lower end portion thereof is formed a male screw 12a to be engaged with the female screw 8b formed on the inner peripheral surface of the recessed portion 8a of the body 8. On the inner peripheral surface of the base presser 12 multiple O-rings 23 are fitted at regular intervals. The base presser 12 is fixed threadably in the recessed portion 8a of the body 8 in a standing manner and supports the actuator box 13 ascendably and descendably on the body 8 (i.e., so the actuator body is ascendably and descendably moveable relative to the base presser 12) as well as presses and fixes the outer peripheral edge of the metal diaphragm 9, the holding adapter 10, and the flange portion 11c of the split base 11 toward the body 8.

Figure 6:
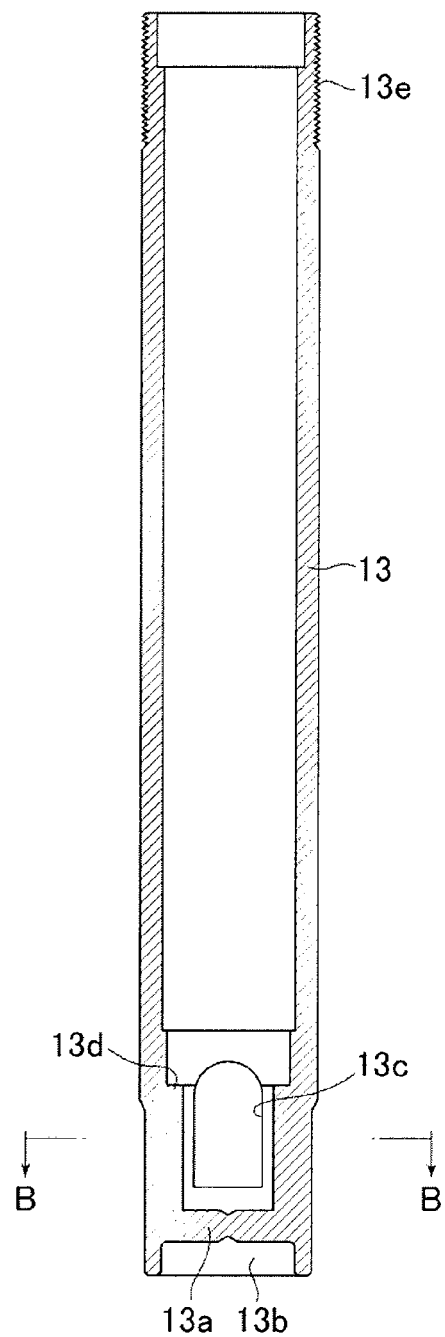
FIG. 6 is a longitudinal sectional view of an actuator box.
Figure 7:
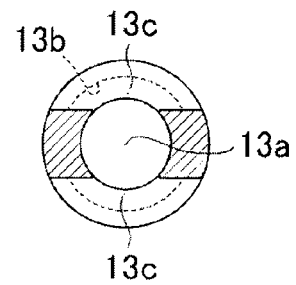
FIG. 7 is a sectional view along the line B-B in FIG. 6.

As shown in FIGS. 2, 6, and 7, the actuator box 13 is made of Invar material, which has a small coefficient of thermal expansion, and the actuator box 13 is formed in a bottomed cylindrical shape, wherein the lower half of which is supported to move ascendably and descendably by the base presser 12 using the O-rings 23. The actuator box 13 houses the disc springs 15, the piezoelectric actuator 16, and the precompression mechanism 20 in its internal space and the actuator box 13 presses the center of the metal diaphragm 9 downward. In the lower surface of the bottom wall 13a of the actuator box 13, there is formed a downward-opened installation hole 13b into which the synthetic-resin diaphragm presser 14, which is to come in contact with the upper surface at the center of the metal diaphragm 9, is inserted and installed. Furthermore, in the peripheral wall at the lower end portion of the actuator box 13, elongated guide holes 13c, into which the upper wall 11b of the split base 11 is inserted, are formed in such a manner so as to face each other. On the inner peripheral surface at the lower end portion of the actuator box 13, a stepped portion 13d for supporting and placing the precompression disc spring 22 of the precompression mechanism 20 thereon is formed at a position higher than that of the upper wall 11b of the split base 11 when assembled. Furthermore, on the outer peripheral surface at the upper end portion of the actuator box 13, there is formed a male screw 13e on which the adjustment cap nut 19 and a lock nut 24 are mounted threadably in a vertically movable and adjustable manner.

Figure 12:
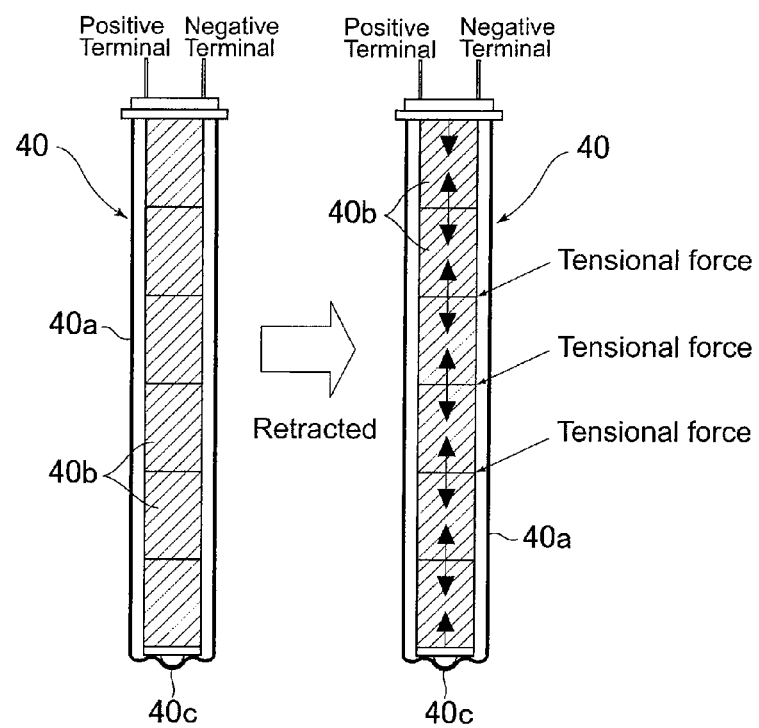
FIG. 12 is a schematic longitudinal sectional view of a piezoelectric actuator (piezo-positioner).

The piezoelectric actuator (piezo-positioner) 16 is formed by housing stacked-type piezoelectric elements in an air-tight manner in a metal casing, wherein a hemispherical displacement member 16a is provided at the leading end of the casing so as to reciprocate along the axial center of the piezoelectric actuator 16 with the extension and retraction of the piezoelectric elements. As shown in FIGS. 1 and 2, the piezoelectric actuator 16 is housed in the actuator box 13 with the hemispherical displacement member 16a protruding downward, the lower end of which is supported on the upper wall 11b of the split base 11 by the precompression part 21 of the precompression mechanism 20, while the upper end of the piezoelectric actuator 16 is supported positionably by the adjustment cap nut 19, which is mounted threadably on the upper end portion of the actuator box 13 in a vertically movable and adjustable manner, via the bearing receiver 17 and the bearing 18. The piezoelectric actuator 16 is thus arranged so as to be extended upward with application of a voltage (the "extended upward" state is shown in the left hand portion of FIG. 12) so as to press the actuator box 13 upward against the elastic force of the disc springs 15.

The precompression mechanism 20 is provided between the upper wall 11b of the split base 11 and the lower end of the piezoelectric actuator 16 and the precompression mechanism 20 applies a compression force constantly to the piezoelectric elements of the piezoelectric actuator 16 regardless of the state of extension or retraction of the piezoelectric actuator 16 so as to relieve a tensional force applied between adjacent piezoelectric elements when retracted (see, e.g., the right hand portion of FIG. 12 for illustration of a retracted state of the piezoelectric elements) and, at the same time, the piezoelectric elements can be applied constantly with a certain compression force even if the actuator box 13 is extended (elongated) by thermal expansion.

That is, as shown in FIGS. 1 and 2, the precompression mechanism 20 is composed of: the shaft-shaped precompression part 21 with a flange 21a disposed so as to move vertically and directly under the piezoelectric actuator 16 within the actuator box 13, wherein the upper end face of the precompression part 21 is in contact with the displacement member 16a provided on the lower end face of the piezoelectric actuator 16, and the lower end face of the precompression part 21 is contactable with the upper wall 11b of the split base 11; and multiple precompression disc springs 22 are provided between the flange 21a of the precompression part 21 and the stepped portion 13d formed on the inner peripheral surface at the lower end portion of the actuator box 13 and, when the lower end face of the precompression part 21 comes into contact with the upper wall 11b of the split base 11, the split base 11 presses the precompression part 21 elastically upward so as to apply pressure constantly to the piezoelectric elements in the piezoelectric actuator 16, whereby the compression force applied to the piezoelectric elements in the piezoelectric actuator 16 can be adjusted freely by changing the number of precompression disc springs 22. In addition, the precompression part 21 is made of stainless steel, and in the upper end face at the center of which is formed a conical receiving groove 21b on which the hemispherical displacement member 16a of the piezoelectric actuator 16 is placed and supported.

When assembling the above-described piezoelectric driven control valve 1, the metal diaphragm 9, the holding adapter 10, the actuator box 13 with the diaphragm presser 14 inserted and installed therein, the disc spring 15, and the split base 11 are first assembled into the recessed portion 8a of the body 8 in this order, and then the actuator box 13 is supported on the body 8 via the base presser 12, while the lower end portion of the base presser 12 is engaged threadably with the inner peripheral surface of the recessed portion 8a of the body 8. This structure allows the holding adapter 10 and the split base 11 to be held and fixed on the body 8 and, at the same time, the outer peripheral edge of the metal diaphragm 9 is held and fixed in an air-tight manner on the body 8 by the holding adapter 10 and other components. Also, the actuator box 13 is supported to move ascendably and descendably relative to the body 8 by the base presser 12 via the O-rings 23.

Figure 3:
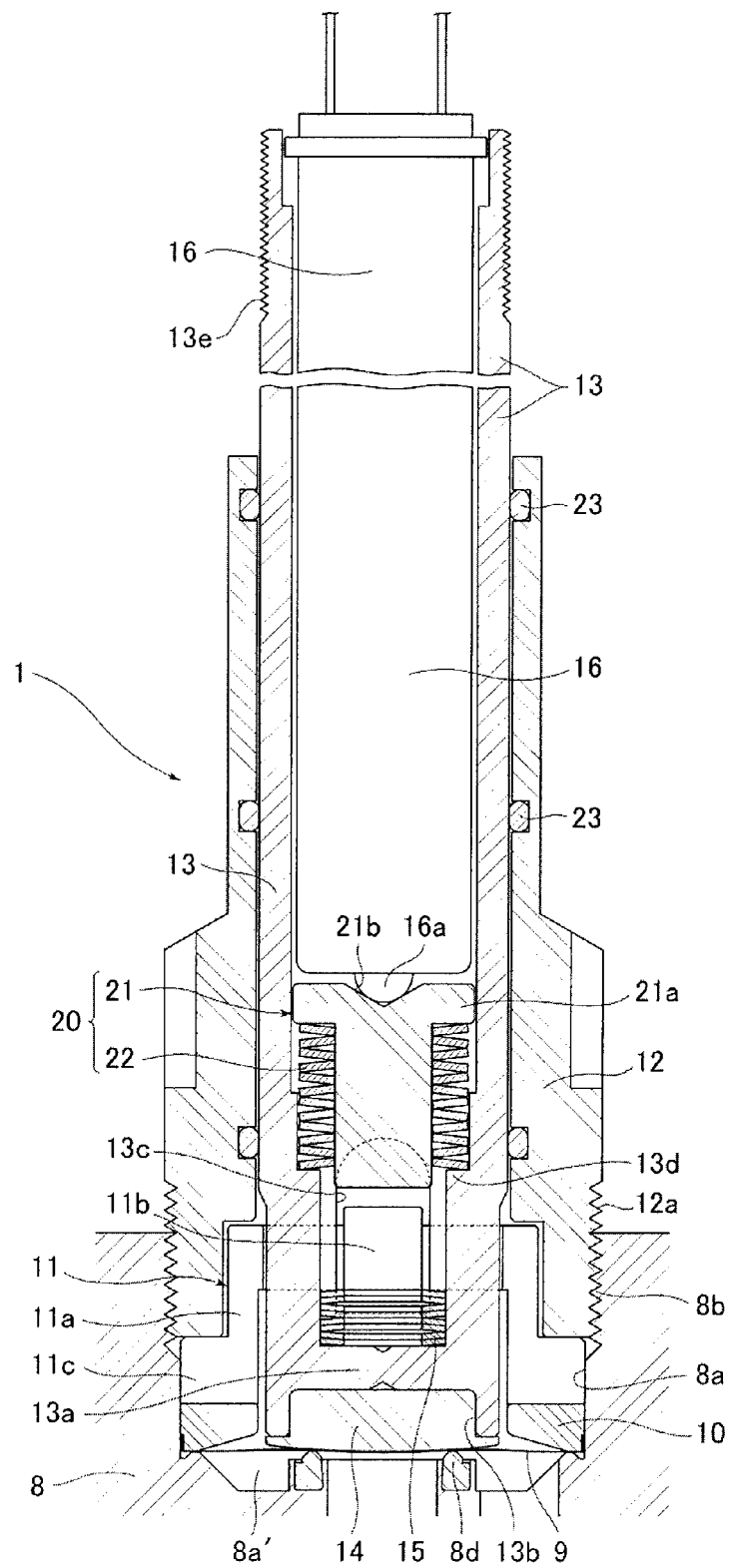
FIG. 3 shows the substantial portion in the piezoelectric driven control valve, according to the first embodiment of the present invention, and is a longitudinal sectional side view before the piezoelectric actuator is precompressed.
Figure 4:
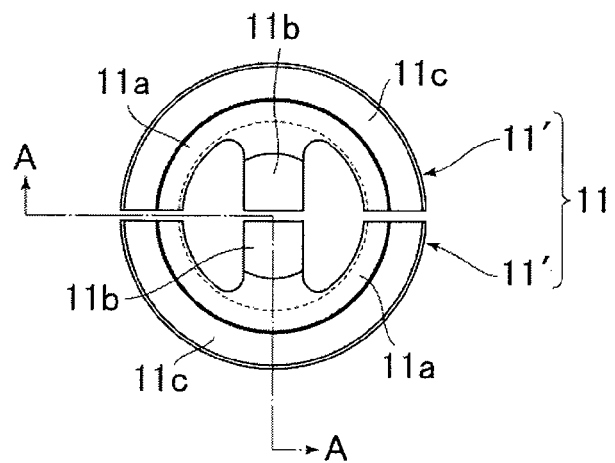
FIG. 4 is a plan view of a split base.
Figure 5:
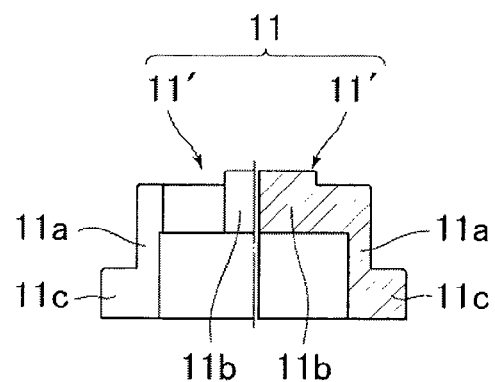
FIG. 5 is a sectional view along the line A-A in FIG. 4.

Next, the precompression disc spring 22 of the precompression mechanism 20, the precompression part 21 of the precompression mechanism 20, and the piezoelectric actuator 16 are housed sequentially into the actuator box 13. In this step, as evident from FIG. 3, the precompression part 21 is supported on the precompression disc spring 22 that is supported and placed on the stepped portion 13d on the inner peripheral surface at the lower end portion of the actuator box 13, and a predetermined gap is formed between the lower end face of the precompression part 21 and the upper surface of the upper wall 11b of the split base 11.

Finally, the bearing receiver 17 and the bearing 18 are installed at the upper end portion of the piezoelectric actuator 16, and then the adjustment cap nut 19 and the lock nut 24 are mounted threadably on the outer peripheral surface at the upper end portion of the actuator box 13. The amount of tightening of the adjustment cap nut 19 is then adjusted so that the lower end face of the precompression part 21 is in contact with the upper surface of the upper wall 11b of the split base 11, and the operation stroke of the metal diaphragm 9 provided by the piezoelectric actuator 16 is adjusted to a set value. With this step, the precompression disc spring 22 is compressed so as to apply a compression force constantly (i.e., at all times) to the piezoelectric actuator 16.

In the piezoelectric driven control valve 1, twelve precompression disc springs 22 may be used, each having a spring constant of 215 N/mm and a maximum compression amount of 2.4 mm and, before adjustment of the stroke of the metal diaphragm 9, a gap of 1.4 mm is formed between the lower end face of the precompression part 21 and the upper surface of the upper wall 11*b* of the split base 11. Therefore, after adjustment of the stroke of the metal diaphragm 9 (so the lower end face of the precompression part 21 is in contact with the upper surface of the upper wall 11*b* of the split base 11), each precompression disc spring 22 is compressed by 1.4 mm and the piezoelectric actuator 16 is precompressed at a pressure of approximately 300N (215 N/mm×1.4 mm). Also, when the piezoelectric driven control valve 1 is assembled, the holding adapter 10, the split base 11, the actuator box 13, the base presser 12, the precompression part 21 and the precompression disc spring 22 of the precompression mechanism 20, and the piezoelectric actuator 16, are all fixed automatically and orderly at their respective predetermined positions and, at the same time, the axial center of all of these members is aligned with an extremely high degree of accuracy. As a result, not only does the assembling accuracy of the piezoelectric driven control valve 1 increase significantly such that the variation in assembling accuracy and the hysteresis phenomenon become less likely to occur, but also the stability and response in operations can be improved.

In the thus constructed piezoelectric driven control valve 1, when the piezoelectric actuator 16 is applied with a drive voltage from a control circuit (not shown in the drawings) via a connector 25, the piezoelectric actuator 16 is extended upward by the set value depending on the applied voltage. This upward extension causes a large upward force to act on the actuator box 13 via the bearing receiver 17, the bearing 18, and the adjustment cap nut 19, which then causes the actuator box 13 to move upward by the set value against the elastic force of the disc springs 15 with the axial center thereof being held by the base presser 12. As a result, the metal diaphragm 9 is separated from the valve seat 8*d* by the elastic force of the metal diaphragm so as to cause the piezoelectric driven control valve 1 to be opened. In this case, the piezoelectric actuator 16 is applied with a compression force by the precompression mechanism 20, and is compressed constantly upward. Therefore, even if the actuator box 13 that houses the piezoelectric actuator 16 is extended due to thermal expansion when, for example, the piezoelectric driven control valve 1 is used under a high-temperature environment, no gap forms between the upper end portion of the piezoelectric actuator 16 and the adjustment cap nut 19. Thus, the piezoelectric actuator 16 can be applied with a certain compression force in a constant manner using the precompression mechanism 20. As a result, this allows a generation force, when the piezoelectric actuator 16 is extended upward as a result of a drive voltage, to be transmitted reliably and successfully to the actuator box 13 so as to make possible high-precision flow control in the piezoelectric driven control valve 1.

On the other hand, when the voltage applied to the piezoelectric actuator 16 is removed, the piezoelectric actuator 16 returns to its original length dimension from the extended state and, at the same time, the actuator box 13 is pressed down by the elastic force of the disc springs 15 to, accordingly, cause the center of the metal diaphragm 9 to be pressed down toward the valve seat 8*d* by the diaphragm presser 14, which is provided at the lower end of the actuator box 13, so as to come into contact with the valve seat 8*d* and thereby the piezoelectric driven control valve 1 is closed. In this case, the piezoelectric actuator 16 is applied with a compression force by the precompression mechanism 20 and is compressed constantly (i.e., is compressed at all times by the precompression mechanism 20). Therefore, even if a tensional force is applied between piezoelectric elements that are adjacent to each other when the piezoelectric actuator 16 is retracted, the tensional force applied between piezoelectric elements that are adjacent each other is relieved by the compression force of the precompression mechanism 20. Therefore, it is possible, in the piezoelectric driven control valve 1, to prevent the piezoelectric elements in the piezoelectric actuator 16 from being damaged by the tensional force, which extends the lifetime of the piezoelectric actuator 16 and ensures reliability of the piezoelectric actuator 16.

Figure 8:
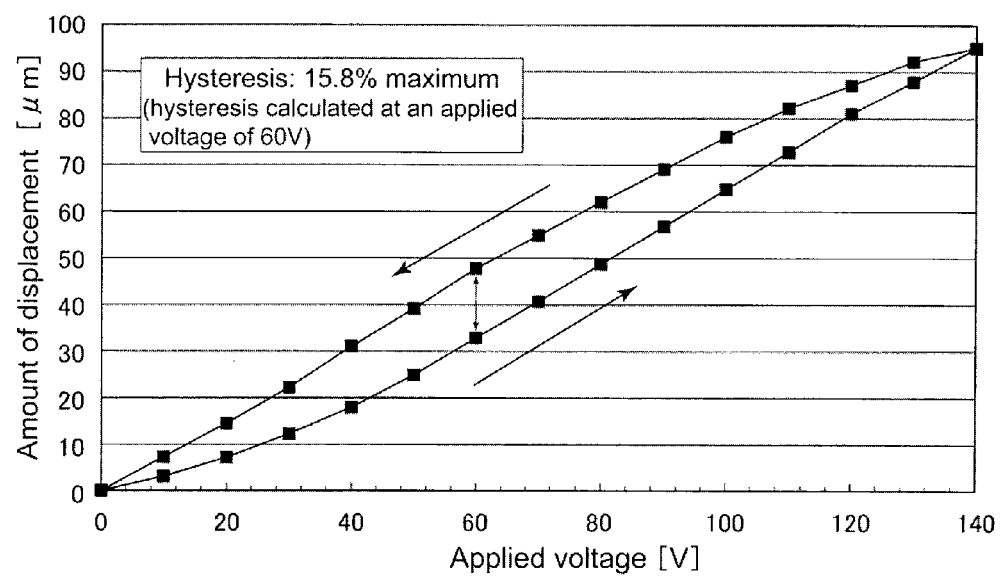
FIG. 8 is a graph showing the relationship between the displacement of the actuator box and the voltage applied to the piezoelectric actuator in the piezoelectric driven control valve with a precompression mechanism incorporated therein.

FIG. 8 is a graph showing the relationship between the displacement of the actuator box 13 and the voltage applied to the piezoelectric actuator 16. To figure out the amount of displacement of the actuator box 13 in a piezoelectric driven control valve 1 provided with the precompression mechanism 20 incorporated therein, the piezoelectric actuator 16 used in the piezoelectric driven control valve 1 has a maximum displacement amount of 96 μm or more (at an applied voltage of 150V) and a hysteresis of 15% or less. The amount of displacement of the actuator box 13 was measured by a depth gauge (not shown in the drawings) by applying a voltage of 0 to 140 V (every 10 V) to the piezoelectric actuator 16 using a piezo-driver (not shown in the drawings). As is clear from the graph in FIG. 8, it was verified that the displacement characteristics of the piezoelectric actuator 16 are sufficiently ensured.

Figure 9:
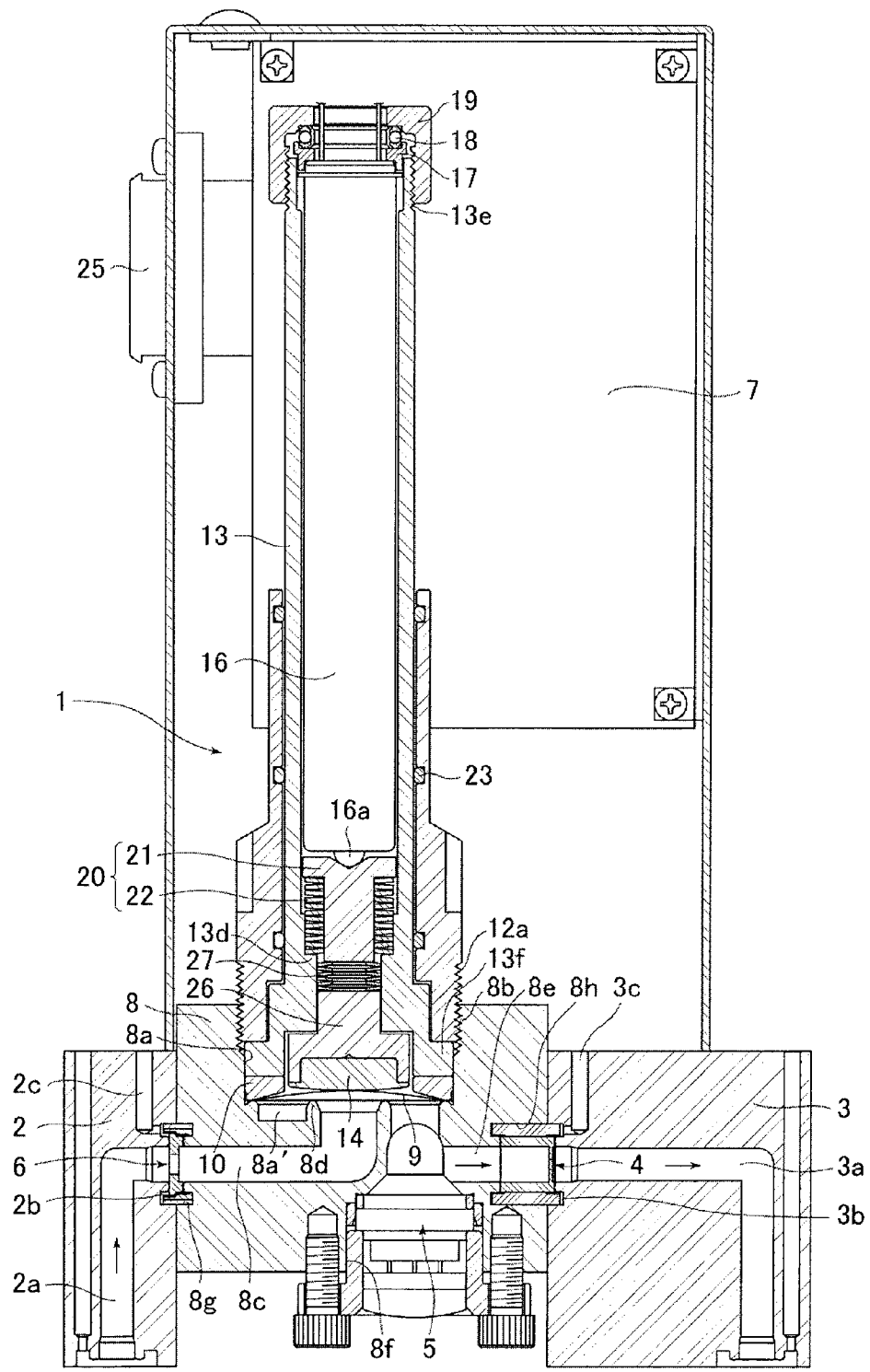
FIG. 9 is a longitudinal sectional front view of a pressure type flow control device employing a piezoelectric driven control valve according to a second illustrative embodiment of the present invention.

FIG. 9 shows a piezoelectric driven control valve 1, according to a second illustrative embodiment of the present invention, employed in a pressure type flow control device. The pressure type flow control device includes: the piezoelectric driven control valve 1; an inlet port block 2 connected on the upstream side of the piezoelectric driven control valve 1; an outlet port block 3 connected on the downstream side of the piezoelectric driven control valve 1; an orifice 4 for flow control provided on the downstream side of the piezoelectric driven control valve 1; a pressure sensor 5 provided on the upstream side of the orifice 4 to detect the upstream side pressure of the orifice 4; a gasket filter 6 provided on the upstream side of the piezoelectric driven control valve 1; and a control circuit 7 for controlling the piezoelectric driven control valve 1, in which the flow rate of passage of fluid through the orifice is calculated based on the upstream side pressure of the orifice 4 and, at the same time, controlled by opening and closing the piezoelectric driven control valve 1.

Figure 10:
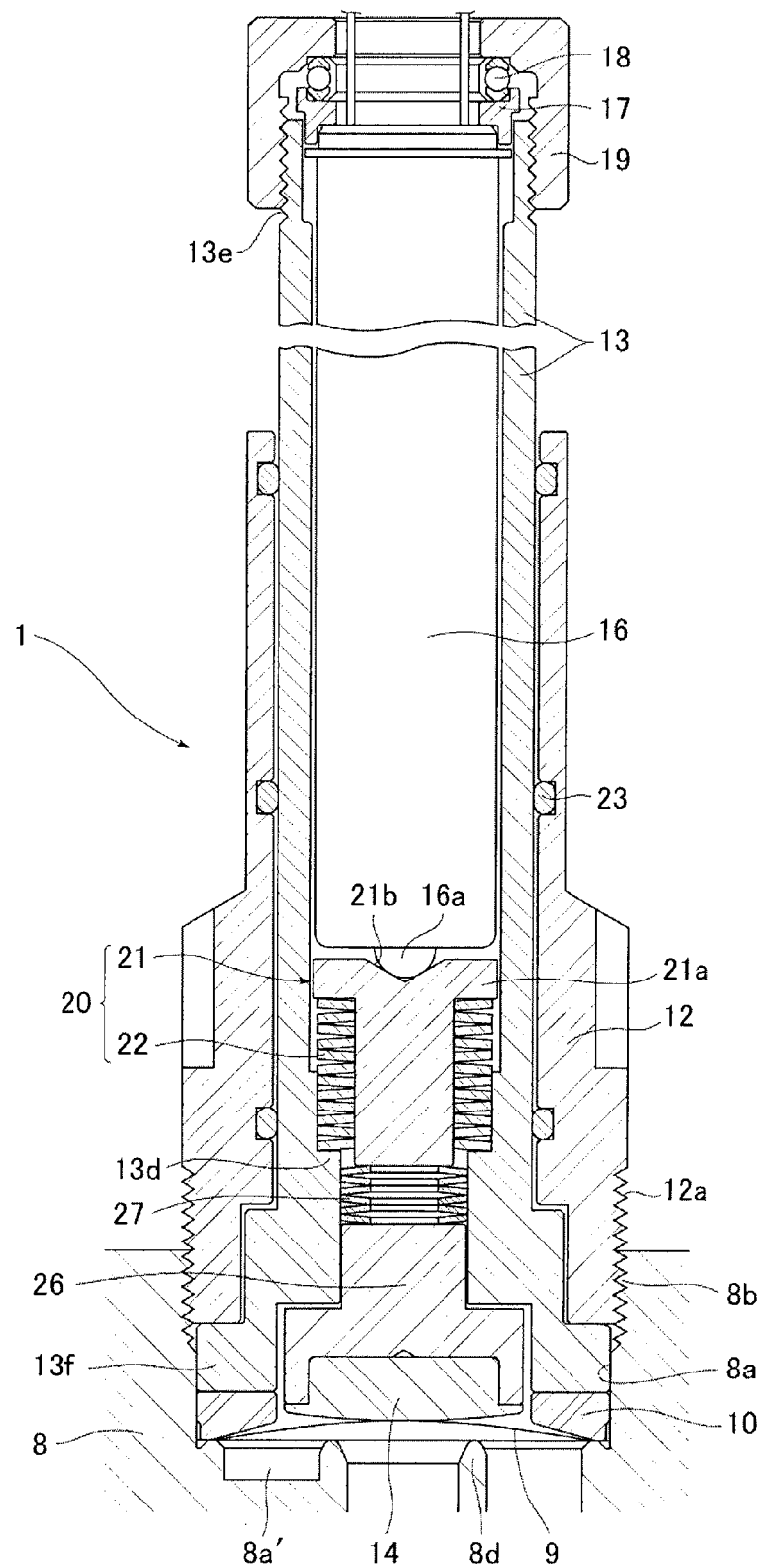
FIG. 10 is a longitudinal sectional front view of a substantial portion of the piezoelectric driven control valve shown in FIG. 9.
Figure 11:
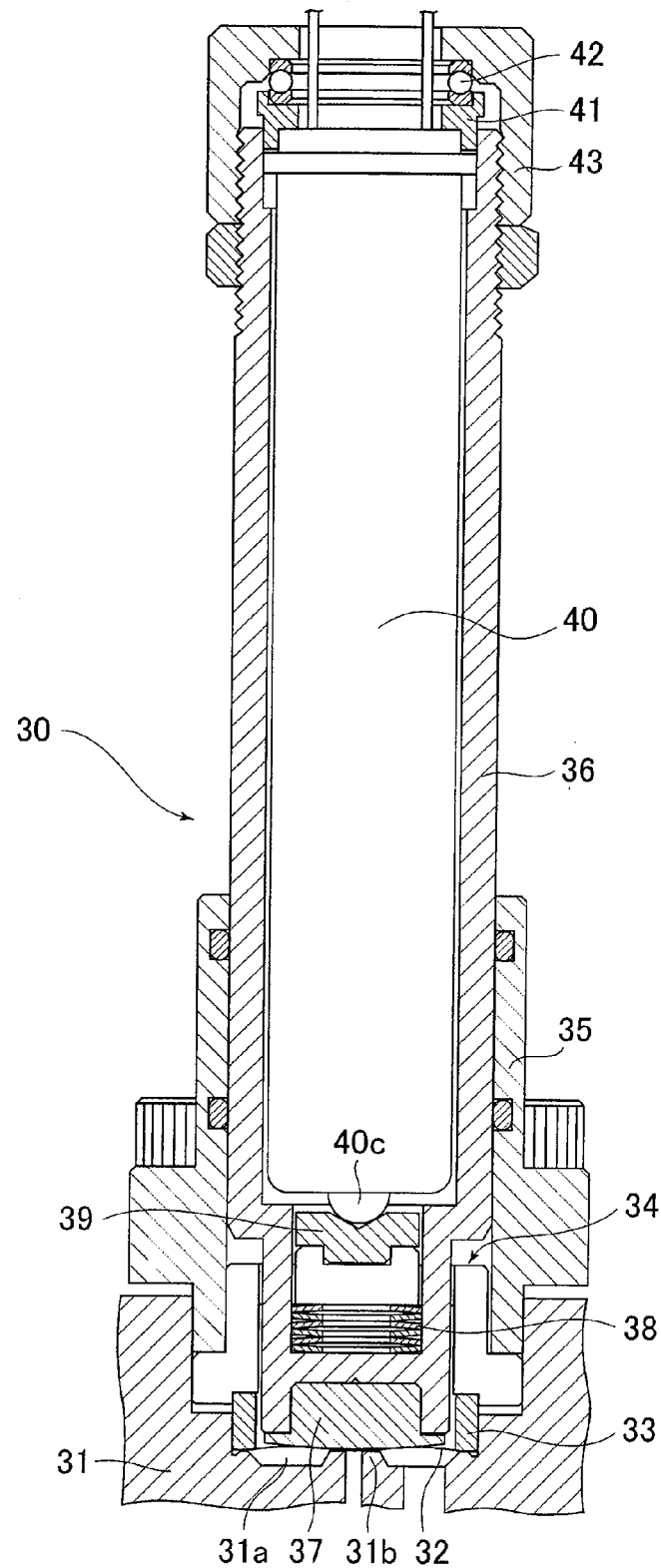
FIG. 11 is a longitudinal sectional front view of a substantial portion of a conventional piezoelectric driven control valve.

As shown in FIG. 10, the piezoelectric driven control valve 1 includes: a body 8 with a valve chamber 8*a'* and a valve seat 8*d* formed therein; a metal diaphragm 9 disposed inside the valve chamber 8*a'* so as to be in contact with, and separatable, from the valve seat 8*d*; a holding adapter 10 for pressing the outer peripheral edge of the metal diaphragm 9 in an air-tight manner toward the body 8; a tubular actuator box 13, wherein the lower end portion thereof is fixed to the body 8 so as to press the holding adapter 10 toward the body 8; a base presser 12 for fixing the holding adapter 10 and the lower end portion of the actuator box 13 to the body 8 so as to support the actuator box 13; a stem 26 disposed so as to move ascendably and descendably inside the lower end portion of the actuator box 13, wherein the stem 26 is provided with a diaphragm presser 14 positioned so as to be in contact with the upper surface of the metal diaphragm 9 that is provided at the lower end thereof; a piezoelectric actuator (piezo-positioner) 16 housed inside the actuator box 13; a cushioning disc spring 27 provided between the stem 26 and the piezoelectric actuator 16 and, when the metal diaphragm 9 comes into contact with the valve seat 8*d*, the cushioning disc spring 27 absorbs the extension of the piezoelectric actuator 16; an adjustment cap nut 19 threadably mounted on the upper end portion of the actuator box 13 so as to positionably support the upper end of the piezoelectric actuator 16 via a bearing receiver 17 and a bearing 18; and a precompression mechanism 20 provided between the lower end of the piezoelectric actuator 16 and the cushioning disc spring 27 so as to apply a compression force constantly (i.e., at all times) to piezoelectric elements in the piezoelectric actuator 16 so as to prevent damage of the piezoelectric elements in the piezoelectric actuator 16 due to a tensional force, as well as to make possible high-precision and stable flow control even under high-temperature environments using high-temperature reaction gases. In the present embodiment of the invention, the piezoelectric driven control valve 1 is formed as a normal open-type control valve.

Specifically, as shown in FIGS. 9 and 10, the body 8 is made of stainless steel and formed in a block shape, and the body 8 includes a recessed portion 8a forming an upward-opened valve chamber 8a', a female screw 8b formed on the inner peripheral surface of the recessed portion 8a, an inlet passage 8c communicating with the valve chamber 8a', an annular valve seat 8d formed on the bottom surface of the recessed portion 8a defining the valve chamber 8a', an outlet passage 8e communicating with the valve chamber 8a', a sensor installation hole 8f in which a pressure sensor 5 is inserted and installed, a filter installation hole 8g in which the gasket filter 6 is inserted and installed, and an orifice installation hole 8h in which an orifice 4 is inserted and installed. On the upstream side, the body 8 is connected, using multiple bolts (not shown in the drawings), with the stainless steel inlet port block 2 that includes an introduction passage 2a communicating with the inlet passage 8c of the body 8, a filter installation hole 2b formed on the outlet side of the introduction passage 2a, and a leak port 2c for checking for leakage of fluid. On the downstream side, the body 8 is also connected, using multiple bolts (not shown in the drawings), with the stainless steel outlet port block 3 that includes a discharge passage 3a communicating with the outlet passage 8e of the body 8, an orifice installation hole 3b formed on the inlet side of the discharge passage 3a, and a leak port 3c for checking for leakage of fluid.

As shown in FIGS. 9 and 10, the metal diaphragm 9 is formed by an ultra-thin plate made of a highly durable, corrosion-resistant, and heat-resistant highly-elastic alloy (e.g., SPRON 100), a nickel-cobalt-based alloy added with tungsten, molybdenum, titan, and chrome, etc., so as to be formed in an inverted dish shape with the center of the metal diaphragm 9 being swelled upward. The metal diaphragm 9 is disposed inside the recessed portion 8a so as to face the valve seat 8d and the outer peripheral edge of the metal diaphragm 9 is held and fixed in an air-tight manner on the body 8 using the holding adapter 10. The metal diaphragm 9 is brought into contact with the valve seat 8d through downward pressure, and is separable from the valve seat 8d by the elastic force of the metal diaphragm 9 from the valve seat 8d when the downward pressure force is lost (i.e., no downward pressure force is applied). It is noted that the metal diaphragm 9 may be made of stainless steel, inconel, or other alloy steel and may be formed by multiple metal diaphragms.

As shown in FIGS. 9 and 10, the holding adapter 10 is formed in an annular shape, is made of stainless steel and is inserted into the recessed portion 8a of the body 8 so as to press and fix the outer peripheral edge of the metal diaphragm 9 in an air tight manner toward the body 8.

As shown in FIGS. 9 and 10, the actuator box 13 is formed in a tubular shape, is made of Invar material, which has a small coefficient of thermal expansion, and, on the outer peripheral surface at the lower end portion of the actuator box 13, an outer stepped portion 13f is formed so it may be inserted into the recessed portion 8a of the body 8 and pressed downward by the base presser 12. The actuator box 13 houses the stem 26, the piezoelectric actuator 16, the cushioning disc spring 27, and the precompression mechanism 20 in an internal space formed in the actuator box 13. On the inner peripheral surface, at the lower end portion of the actuator box 13, a stepped portion 13d for supporting and placing the precompression disc spring 22 of the precompression mechanism 20 thereon is formed in the actuator box 13. Furthermore, on the outer peripheral surface, at the upper end portion of the actuator box 13, there is formed a male screw 13e on which the adjustment cap nut 19 and a lock nut 24 are mounted threadably in a vertically movable and adjustable manner.

As shown in FIGS. 9 and 10, the base presser 12 is made of stainless steel and is formed in a cylindrical shape, and on the outer peripheral surface at the lower end portion thereof is formed a male screw 12a that is to be engaged with the female screw 8b formed on the inner peripheral surface of the recessed portion 8a of the body 8, while on the inner peripheral surface of the base presser 12 are fitted multiple O-rings 23 at regular intervals. The base presser 12 is fixed threadably in the recessed portion 8a of the body 8 in a standing manner and supports the actuator box 13 on the body 8 as well as the base presser 12 presses and fixes the outer peripheral edge of the metal diaphragm 9, the holding adapter 10, and the outer stepped portion 13f of the actuator box 13, toward the body 8.

As shown in FIGS. 9 and 10, the stem 26 is formed in a stepped shaft shape, is made of stainless steel or Invar material, which has a small coefficient of thermal expansion, and is inserted to move ascendably and descendably inside the lower end portion of the actuator box 13. The synthetic-resin diaphragm presser 14, which is to be in contact with the upper surface at the center of the metal diaphragm 9, is inserted and installed at the lower end of the stem 26.

The piezoelectric actuator (piezo-positioner) 16 is formed by housing stacked-type piezoelectric elements in an air tight manner in the metal casing of the piezoelectric actuator, wherein a hemispherical displacement member 16a is provided at the leading end of the casing so as to reciprocate along the axial center of the piezoelectric actuator 16 in accordance with the extension and retraction of the piezoelectric elements. As shown in FIGS. 9 and 10, the piezoelectric actuator 16 is housed in the actuator box 13 so that the hemispherical displacement member 16a is protruding downward, and the upper end of the piezoelectric actuator 16 is supported positionably by the adjustment cap nut 19, which is mounted threadably on the upper end portion of the actuator box 13 in a vertically movable and adjustable manner, using the bearing receiver 17 and the bearing 18. The lower end of the piezoelectric actuator 16 is supported on the stem 26 by the precompression mechanism 20 and the cushioning disc spring 27. The piezoelectric actuator 16 is also arranged so as to be extended downward with application of a voltage so as to press the stem 26 downward via the precompression mechanism 20 and the cushioning disc spring 27.

The cushioning disc spring 27 is provided between the upper end of the stem 26 and the lower end of the piezoelectric actuator 16 and, when the stem 26 is pressed down due to the extension of the piezoelectric actuator 16, then the metal diaphragm 9 comes into contact with the valve seat 8d, and the cushioning disc spring 27 absorbs a portion of the extension of the piezoelectric actuator 16 so as to apply a predetermined pressure force to a seat member (i.e., the seat member is composed of the valve seat 8d and the portion of the metal diaphragm 9 that is in contact with the valve seat 8d) of the piezoelectric driven control valve 1. In accordance with the present illustrative embodiment of the invention, the cushioning disc spring 27 is composed of multiple stacked springs supported and placed on the upper surface of the stem 26.

The precompression mechanism 20 is provided between the lower end of the piezoelectric actuator 16 and the cushioning disc spring 27 and the precompression mechanism 20 applies a compression force constantly (i.e., at all times) to the piezoelectric elements in the piezoelectric actuator 16 regardless of extension or retraction state of the piezoelectric actuator 16 so as to relieve a tensional force applied between piezoelectric elements adjacent to each other when retracted and, at the same time, the piezoelectric elements can be applied constantly (i.e., at all times) with a certain compression force even if the actuator box 13 is extended (expanded) by thermal expansion.

That is, as shown in FIGS. 9 and 10, the precompression mechanism 20 is composed of: a shaft-shaped precompression part 21 provided with a flange 21a disposed so as to move vertically directly under the piezoelectric actuator 16 and within the actuator box 13, wherein the upper end face of the precompression part 21 is in contact with the displacement member 16a provided on the lower end face of the piezoelectric actuator 16, and the lower end face of the precompression part 21 is contactable with the cushioning disc spring 27; and multiple precompression disc springs 22 are provided between the flange 21a of the precompression part 21 and the stepped portion 13d formed on the inner peripheral surface at the lower end portion of the actuator box 13 and, when the lower end face of the precompression part 21 comes into contact with the cushioning disc spring 27, the cushioning disc spring 27 presses the precompression part 21 elastically upward so as to apply pressure constantly (i.e., at all times) to the piezoelectric elements in the piezoelectric actuator 16 so that the compression force applied to the piezoelectric elements in the piezoelectric actuator 16 can be adjusted freely by changing the number of precompression disc springs 22. In addition, the precompression part 21 is made of stainless steel, and in the upper end face of the precompression part 21 there is formed, at the center, a conical receiving groove 21b on which the hemispherical displacement member 16a of the piezoelectric actuator 16 is supported and placed.

When assembling the above-described piezoelectric driven control valve 1 shown in FIGS. 9 and 10, the metal diaphragm 9, the holding adapter 10, and the actuator box 13, provided with the stem 26 and the cushioning disc spring 27 inserted therein, are first assembled into the recessed portion 8a of the body 8 in this order, and then the actuator box 13 is supported on the body 8 by the base presser 12, and the lower end portion of the base presser 12 is engaged threadably with the inner peripheral surface of the recessed portion 8a of the body 8. This construction allows the holding adapter 10 and the actuator box 13 to be held and fixed on the body 8 and, at the same time, the outer peripheral edge of the metal diaphragm 9 is held and fixed in an air-tight manner on the body 8 by the holding adapter 10 and other components as described above.

Next, the precompression disc spring 22 of the precompression mechanism 20, the precompression part 21 of the precompression mechanism 20, and the piezoelectric actuator 16 are housed sequentially into the actuator box 13. In accordance with this assembly step, the precompression part 21 is supported on the precompression disc spring 22, which is supported and placed on the stepped portion 13d on the inner peripheral surface at the lower end portion of the actuator box 13, and a predetermined gap is formed between the lower end face of the precompression part 21 and the upper surface of the cushioning disc spring 27 (e.g. in a manner similar to that shown in FIG. 3).

Finally, the bearing receiver 17 and the bearing 18 are installed at the upper end portion of the piezoelectric actuator 16, and then the adjustment cap nut 19 and the lock nut 24 are mounted threadably on the outer peripheral surface at the upper end portion of the actuator box 13. The amount of tightening of the adjustment cap nut 19 is then adjusted so that the lower end face of the precompression part 21 comes in contact with the upper surface of the cushioning disc spring 27, and the operation stroke of the metal diaphragm 9, provided by the piezoelectric actuator 16, is adjusted to a set value. In accordance with this step, the precompression disc spring 22 is compressed so as to apply a compression force constantly (i.e., at all times) to the piezoelectric actuator 16. In the present illustrative embodiment, the piezoelectric actuator 16 is precompressed at a pressure of approximately 300N.

In the piezoelectric driven control valve 1 constructed as shown in FIGS. 9 and 10, when the piezoelectric actuator 16 is applied with a drive voltage from a control circuit (not shown in the drawings) via a connector 25, the piezoelectric actuator 16 is extended downward by a set value depending on the applied voltage. As a result, the stem 26 is pressed down by the precompression part 21 and the cushioning disc spring 27, which then causes the center of the metal diaphragm 9 to be pressed down toward the valve seat 8d by the diaphragm presser 14, which is provided at the lower end of the stem 26. Consequently, the diaphragm 9 comes into contact with the valve seat 8d and the piezoelectric driven control valve 1 is closed. In this case (i.e., the piezoelectric driven control valve is closed), the piezoelectric actuator 16 is applied with a compression force by the precompression mechanism 20 so that the piezoelectric actuator 16 is pressed constantly upward. Therefore, even if the actuator box 13, which houses the piezoelectric actuator 16, is extended by thermal expansion when, for example, the piezoelectric driven control valve 1 is used under a high-temperature environment, then no gap forms between the upper end portion of the piezoelectric actuator 16 and the adjustment cap nut 19. In this way, the piezoelectric actuator 16 can be applied with a certain compression force constantly using the precompression mechanism 20. As a result, this structure allows a generation force, when the piezoelectric actuator 16 is extended, to be transmitted reliably and successfully to the stem 26 so as to make high-precision flow control possible using the piezoelectric driven control valve 1.

After the metal diaphragm 9 comes into contact with the valve seat 8d, the cushioning disc spring 27, provided between the stem 26 and the precompression part 21, absorbs further extension of the piezoelectric actuator 16, and a repulsive force is applied to the seat member (composed of the valve seat 8d and the portion of the metal diaphragm 9 that is in contact with the valve seat 8d) based on the amount of displacement of the cushioning disc spring 27. Therefore, in accordance with the piezoelectric driven control valve 1 of the present invention, the large generative force from the piezoelectric actuator 16 cannot be applied directly to the seat member, which serves to prevent the metal diaphragm 9 and the valve seat 8d from being damaged by a large generative force from the piezoelectric actuator 16.

On the other hand, when the voltage applied to the piezoelectric actuator 16 is removed, the piezoelectric actuator 16 returns to its original length dimension from the extended state and thus the pressure force applied to the metal diaphragm 9 by the extended state of the piezoelectric actuator 16 is lost, which accordingly causes the metal diaphragm 9 to recover its original state due to the elastic force of the metal diaphragm 9, which then causes the metal diaphragm 9 to be separated from the valve seat 8*d* thereby opening the piezoelectric driven control valve 1. In this case wherein the piezoelectric driven control valve 1 is in the opened state, the piezoelectric actuator 16 is applied with a compression force by the precompression mechanism 20 and is compressed in a constant manner. Therefore, even if a tensional force is applied between piezoelectric elements adjacent to each other when the piezoelectric actuator 16 is retracted, the tensional force applied between piezoelectric elements adjacent each other is relieved by the compression force of the precompression mechanism 20. It is therefore possible, in accordance with the piezoelectric driven control valve 1 of the present invention, to prevent the piezoelectric elements in the piezoelectric actuator 16 from being damaged by the tensional force, which extends the lifetime of, and ensures reliability of, the piezoelectric actuator 16. In addition, because the piezoelectric actuator 16 is applied with a compression force by the precompression mechanism 20 and is compressed constantly upward, the full weight of the piezoelectric actuator 16 is not applied to the metal diaphragm 9, but only the full weights of the diaphragm presser 14, the stem 26, and the cushioning disc spring 27 are applied to the metal diaphragm 9. It is therefore possible, in accordance the piezoelectric driven control valve 1 of the invention, to limit the weight (force) applied to the metal diaphragm 9 so that the burden on the metal diaphragm 9, when separated from the valve seat 8*d* by the elastic force of the metal diaphragm, is reduced, which can extend the lifetime of the metal diaphragm 9.

Industrial Applicability

The piezoelectric driven control valve 1, according to the present invention, is mainly applicable to a gas control line in semiconductor manufacturing equipment, but is not limited to such semiconductor manufacturing equipment in its application, and is also applicable to a gas supply line in various types of equipment used in, for example, the chemical, pharmaceutical, and food processing industries.

The invention claimed is:

1. A piezoelectric driven control valve comprising:
   (a) a body provided with a valve seat formed at a bottom of an upward-opened valve chamber formed in the body;
   (b) a metal diaphragm disposed inside the valve chamber so as to contact the valve seat through a downward pressure and to be separable from the valve seat due to a first elastic force of the metal diaphragm when the downward pressure is absent;
   (c) a bottomed tubular actuator box supported to move ascendably and descendably on the body, wherein the actuator box has a diaphragm presser disposed at a lower end of the actuator box so that the diaphragm presser contacts an upper surface of the metal diaphragm;
   (d) a split base fixed to the body and having an upper wall, wherein the upper wall of the split base is inserted into an elongated guide hole that is formed in a peripheral wall at a lower end portion of the actuator box so that the upper wall of the split base faces an upper surface of a bottom wall of the actuator box;
   (e) a disc spring provided between the bottom wall of the actuator box and the upper wall of the split base, wherein the disc spring exerts a second elastic force that presses and urges the actuator box downward so as provide via the diaphragm presser the downward pressure that brings the metal diaphragm into contact with the valve seat;
   (f) a piezoelectric actuator housed inside the actuator box, wherein an upper end of the piezoelectric actuator is supported positionably at an upper portion end of the actuator box, and wherein a lower end of the piezoelectric actuator is supported on the upper wall of the split base, and wherein the piezoelectric actuator is extended upward with application of a voltage to piezoelectric elements in the piezoelectric actuator so as to press the actuator box upward against the second elastic force of the disc spring so that the downward pressure is absent and the metal diaphragm separates from the valve seat due to the first elastic force of the metal diaphragm; and
   (g) a precompression mechanism is provided between the upper wall of the split base and the lower end of the piezoelectric actuator, wherein the precompression mechanism is disposed to apply a compression force constantly to the piezoelectric elements in the piezoelectric actuator.

2. The piezoelectric driven control valve according to claim 1, wherein the precompression mechanism comprises:
   i. a shaft-shaped precompression part provided with a flange, wherein the precompression part is disposed to move vertically directly under the piezoelectric actuator and within the actuator box, wherein an upper end face of the precompression part is in contact with a displacement member provided on the lower end of the piezoelectric actuator, and wherein a lower end face of the precompression part is contactable with the upper wall of the split base; and
   ii. a precompression disc spring provided between the flange of the precompression part and a stepped portion formed on an inner peripheral surface of the actuator box at the lower end portion of the actuator box and, when the lower end face of the precompression part comes into contact with the upper wall of the split base, the precompression disc spring presses the precompression part elastically upward so as to apply pressure constantly to the piezoelectric elements in the piezoelectric actuator.

3. A piezoelectric driven control valve comprising:
   (a) a body provided with a valve seat formed at a bottom of an upward-opened valve chamber formed in the body;
   (b) a metal diaphragm disposed inside the valve chamber so as to contact the valve seat through a downward pressure and to be separable from the valve seat due to a first elastic force of the metal diaphragm when the downward pressure is absent;
   (c) a tubular actuator box disposed above the valve chamber, wherein a lower end portion of the actuator box is fixed to the body;
   (d) a stem disposed to move ascendably and descendably inside the lower end portion of the actuator box, wherein the stem is provided with a diaphragm presser provided at a lower end of the stem so as to be in contact with an upper surface of the metal diaphragm;
   (e) a piezoelectric actuator housed inside the actuator box, wherein an upper end of the piezoelectric actuator is supported positionably at an upper end portion of the actuator box, and wherein a lower end of the piezoelectric actuator is supported on the stem;
   (f) a cushioning disc spring provided between an upper end of the stem and the lower end of the piezoelectric actuator and, when the metal diaphragm contacts the valve seat, the cushioning disc spring absorbs extension of the piezoelectric actuator so as to apply a predetermined pressure force to a seat member that comprises the valve seat and that portion of the metal diaphragm contact with the valve seat, wherein the piezoelectric actuator is extended downward with application of a voltage to piezoelectric elements in the piezoelectric actuator so as to press the stem and the diaphragm presser down via the cushioning disc spring so that the metal diaphragm is brought into contact with the valve seat; and (g) a precompression mechanism is provided between the lower end of the piezoelectric actuator and the cushioning disc spring, wherein the precompression mechanism is disposed to apply a compression force constantly to the piezoelectric elements in the piezoelectric actuator.

4. The piezoelectric driven control valve according to claim 3, wherein the precompression mechanism comprises:

i. a shaft-shaped precompression part provided with a flange, wherein the precompression part is disposed to move vertically directly under the piezoelectric actuator and within the actuator box, wherein an upper end face of the precompression part is in contact with a displacement member provided on the lower end of the piezoelectric actuator, and wherein a lower end face of the precompression part is contactable with the cushioning disc spring; and ii. a precompression disc spring provided between the flange of the precompression part and a stepped portion formed on an inner peripheral surface of the actuator box at the lower end portion of the actuator box and, when the lower end face of the precompression part comes into contact with the cushioning disc spring, the precompression disc spring presses the precompression part elastically upward so as to apply pressure constantly to the piezoelectric elements in the piezoelectric actuator.

* * * * *